US012743321B1

(12) United States Patent
Nalli et al.

(10) Patent No.: US 12,743,321 B1
(45) Date of Patent: Sep. 22, 2026

(54) AUTOMATED COMPUTING RESOURCE MANAGEMENT OPTIMIZATION WITH GENERATING RESOURCE CONFIGURATION FILE FOR PROVISIONING COMPUTING RESOURCES

(71) Applicant: THE HUNTINGTON NATIONAL BANK, Columbus, OH (US)

(72) Inventors: Sekar Kumaraswamy Nalli, Columbus, OH (US); Srinivas Nedunuri, Columbus, OH (US); Charan Vemulapalli, Columbus, OH (US); Bryan R. Boettcher, Columbus, OH (US); Sagar Chamlagai, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/283,734

(22) Filed: Jul. 29, 2025

(51) Int. Cl.
*G06F 9/50* (2006.01)
*G06F 8/30* (2018.01)
*G06F 8/60* (2018.01)
*G06F 21/12* (2013.01)

(52) U.S. Cl.
CPC .............. *G06F 9/5077* (2013.01); *G06F 8/30* (2013.01); *G06F 8/60* (2013.01); *G06F 21/121* (2013.01)

(58) Field of Classification Search
None
See application file for complete search history.

(56) References Cited

U.S. PATENT DOCUMENTS

| | | | | |
|---|---|---|---|---|
| 6,434,708 | B1 * | 8/2002 | Dunnihoo | G06F 9/4825 713/400 |
| 8,423,986 | B1 * | 4/2013 | Grechanik | G06F 11/3676 702/179 |
| 2006/0074946 | A1 * | 4/2006 | Pham | H04L 41/042 |
| 2007/0101167 | A1 * | 5/2007 | Lindley | G06F 1/3209 713/300 |
| 2009/0007157 | A1 * | 1/2009 | Ward | G06F 8/24 719/328 |
| 2010/0154043 | A1 * | 6/2010 | Castellucci | G06F 21/6218 726/9 |
| 2011/0320605 | A1 * | 12/2011 | Kramer | H04L 67/34 709/226 |

(Continued)

*Primary Examiner* — Zujia Xu
(74) *Attorney, Agent, or Firm* — Kilpatrick Townsend & Stockton LLP

(57) ABSTRACT

Techniques are described herein for automated provisioning of computing resources in a cloud environment. Techniques can include receiving, at an interface of a resource provisioning system, source code including one or more commands to provision one or more computing resources in a cloud environment. The source code may be stored in a centralized repository including access control functionality. An orchestration module of the resource provisioning system may deploy a deployment pipeline based on the source code. A utility module of the resource provisioning system may execute the deployment pipeline to provision the one or more computing resources in the cloud environment. A resource configuration file may be generated based on the execution of the deployment pipeline, where the resource configuration file includes a currents state of the computing resources.

19 Claims, 7 Drawing Sheets

(56) References Cited

U.S. PATENT DOCUMENTS

| | | | | |
|---|---|---|---|---|
| 2014/0089896 | A1* | 3/2014 | Mansour | G06F 8/60<br>717/122 |
| 2015/0294319 | A1* | 10/2015 | Dyrdal | G01B 21/00<br>705/317 |
| 2017/0124513 | A1* | 5/2017 | Boss | G06Q 10/103 |
| 2019/0208077 | A1* | 7/2019 | Jones | H04N 1/32229 |
| 2021/0034427 | A1* | 2/2021 | Duda | G06F 9/5022 |
| 2021/0208934 | A1* | 7/2021 | Jadhav | G06F 8/60 |
| 2023/0403265 | A1* | 12/2023 | Gaffney | H04L 63/083 |
| 2024/0394113 | A1* | 11/2024 | Wiegley | G06F 9/45558 |
| 2025/0077263 | A1* | 3/2025 | Karri | G06F 16/2379 |

* cited by examiner

AUTOMATED COMPUTING RESOURCE MANAGEMENT OPTIMIZATION WITH GENERATING RESOURCE CONFIGURATION FILE FOR PROVISIONING COMPUTING RESOURCES

TECHNICAL FIELD

This application generally relates to computer systems, and more particularly to systems, methods, and non-transitory, computer-readable media to automate computing resource provisioning.

BACKGROUND

Computing resources are used to perform a variety of functions such as executing data and processing storage in various computing environments. In some instances, computing resources can be hosted in a cloud environment hosted by a cloud service provider that may include one or more cloud services. Accessing on-demand computing resources in cloud environments can improve scalability and flexibility for users and organizations. However, increased scalability of resources can introduce challenges in managing and provisioning computing resources. In particular, managing computing resources in multi-cloud environments and hybrid cloud environments, which can include resources hosted on-premises and in a cloud environment, can be optimized with automated systems and processes for provisioning resources.

BRIEF SUMMARY

Techniques are provided for automated computing resource management. Various embodiments are described herein, including methods, systems, non-transitory computer-readable storage media storing programs, code, or instructions executable by one or more processors, and the like.

One embodiment is directed to a computer-implemented method including receiving source code inputted at an interface of a resource provisioning system. The source code can include one or more commands to provision one or more computing resources in a cloud environment. The method can further include storing the source code in a centralized repository of the resource provisioning system. The centralized repository can include access control functionality to control access to the source code. The method can further include deploying, by an orchestration module of the resource provisioning system and based on the source code, a deployment pipeline (e.g., a continuous integration and/or continuous development (CI/CD) pipeline), executing, by a utility module of the resource provisioning system, the deployment pipeline to provision the one or more computing resources in the cloud environment, and generating, by the resource provisioning system, a resource configuration file based on the execution of the deployment pipeline, wherein the resource configuration file comprises a current state of the one or more computing resources.

In some embodiments, the source code can include one or more application programming interface (API) calls that are each executable to access a respective resource of the cloud environment. Executing the one or more API calls can cause one or more changes to a computing resource of the one or more computing resources.

In some embodiments, deploying the deployment pipeline can include accessing, by the orchestration module, an orchestration module library comprising one or more parameters. Deploying the deployment pipeline can further include modifying the source code by replacing a portion of the source code with a corresponding parameter of the one or more parameters and generating, by the orchestration module and based on the source code, an execution plan comprising one or more steps to execute the source code.

In some embodiments, the one or more parameters can include a credential. Deploying the deployment pipeline further can further include generating, by the orchestration module, an association between the credential stored in the orchestration module library and a corresponding portion of the source code.

In some embodiments, the method can further include determining that an execution of the deployment pipeline comprises a modification to at least one computing resource of the one or more computing resources associated with the resource configuration file. The method can further include performing a comparison of a modified state of the one or more computing resources and the current state indicated by the resource configuration file, requesting, from a particular entity and based on the comparison, an approval of the modification to the at least one computing resource, based on receiving the approval from the particular entity, applying the modification to the at least one computing resource, and generating an updated resource configuration file based on the modification to the at least one computing resource.

In some embodiments, executing, by the utility module, the deployment pipeline can include populating the utility module with one or more execution tools that provide a respective functionality to execute the source code, and executing, by an agent hosted on the utility module and using the one or more execution tools, one or more steps of the deployment pipeline to provision the one or more computing resources in the cloud environment.

In some embodiments, the method can further include identifying, by a change management system associated with the orchestration module, a change record associated with the one or more computing resources. The method can further include prior to executing the deployment pipeline, determining whether there is a discrepancy between a change record state value corresponding to the change record and an expected state value; and in response to determining that the change record state value matches the expected state value, authorizing the execution of the deployment pipeline.

In some embodiments, the method can further include prior to executing the deployment pipeline: receiving user input providing instructions to initiate an execution of the deployment pipeline, determining, based on access credentials associated with a user profile corresponding to the user input, access privileges of the user profile, and determining that the access privileges permit the execution of the deployment pipeline.

At least one embodiment is directed to a system comprising one or more processors and one or more memories storing computer-executable instructions that, when executed by the one or more processors, cause the one or more processors to perform the method(s) disclosed herein.

At least one embodiment is directed to a computing device comprising one or more processors and one or more memories storing computer-executable instructions that, when executed by the one or more processors, cause the one or more processors to perform the method(s) disclosed herein.

At least one embodiment is directed to a non-transitory computer-readable storage medium storing computer-executable instructions that, when executed with one or more processors of a computing device, causes the one or more processors to perform the method(s) disclosed herein.

BRIEF DESCRIPTION OF THE DRAWINGS

Various embodiments in accordance with the present disclosure will be described with reference to the drawings, in which.

DETAILED DESCRIPTION

Figure 1:
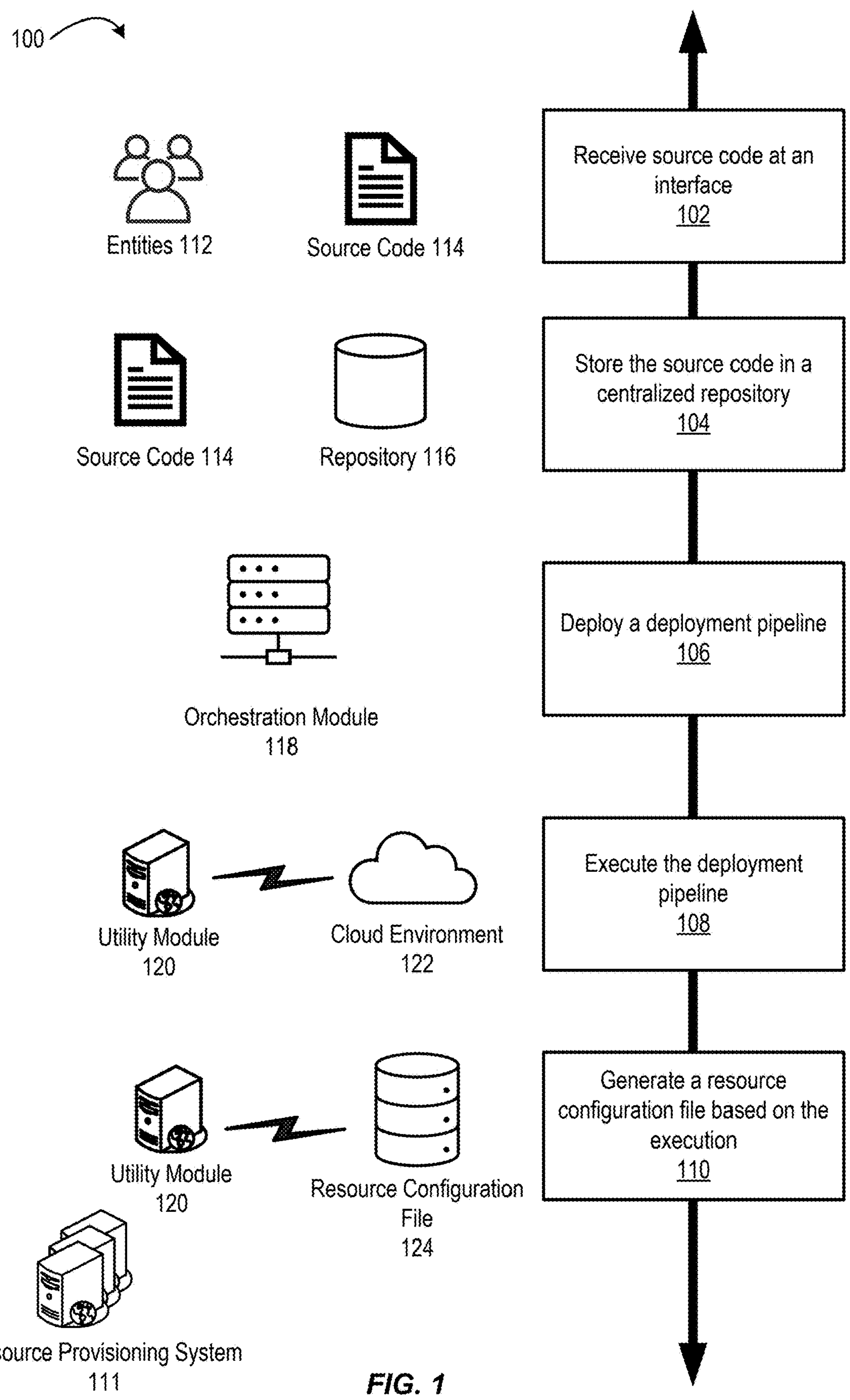
FIG. 1 is an example flow for provisioning computing resources, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to provisioning computing resources, such as cloud computing resources. In some embodiments, techniques are described for deploying and executing a continuous integration (CI) pipeline based on source code including one or more commands to provision one or more computing resources in a cloud environment. Various embodiments are described herein, including methods, systems, non-transitory computer-readable storage media storing programs, code, or instructions executable by one or more processors, and the like.

Some or all of the processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program including a set of instructions executable by one or more processing devices. The computer-readable storage medium may be non-transitory.

In various computing and system environments, computing resources are commonly used to process data, store information, and perform various computing operations. Examples of computing resources can include, but are not limited to, servers, virtual machines, containers, computing devices, and the like. In some cases, computing resources can be on-premises and physically located on computing infrastructure, including hardware, software, or combinations thereof, managed by an organization or user. In other cases, computing resources can be hosted in a cloud environment. A cloud environment can refer to a virtual configuration of computing resources executed and hosted on physical servers managed by a cloud service provider. Cloud service providers may provide various cloud services such as software-as-a-service (SaaS) services and infrastructure-as-a-service (IaaS) services. Cloud services may enable users to access on-demand computing resources such as servers, storage, databases, and software.

An entity (e.g., user, developer, organization, etc.) may provision and manage resources in the cloud environment via an interface provided by a cloud service provider. For example, a user may provision a computing resource by accessing a dashboard and making various selections corresponding to attributes of a computing resource. Provisioning a computing resource can include creating a new computing resource, modifying an existing computing resource, deleting an existing computing resource, or making other similar changes to one or more components of a computing resource. Manual computing infrastructure management, however, can be time-consuming and error prone, particularly for applications or projects associated with a large number of computing resources. Further, manual computing resource management can increase challenges in provisioning resources in hybrid or multi-cloud environments, collaborating on resource provisioning, and automating resource provisioning processes for consistency and version control.

Infrastructure-as-code (IaC) may be implemented to enable entities to manage and provision computing resources automatically and/or programmatically using code. Conventional techniques for natively implementing infrastructure-as-code within an application or environment managed by the entity, however, often directly use tools provided by a cloud provider to manage and provision infrastructure, which can limit an application to a single cloud provider or cloud environment. External IaC services may be used to provision and manage computing resources across cloud environments. However, incorporating an external IaC service can introduce various challenges in infrastructure overhead and security risks. As an example, incorporating an external service may prompt an entity to reconfigure certain security protocols, such as opening a firewall by creating exceptions for potentially vulnerable network traffic associated with the external service. External services may further contain security vulnerabilities in managing credentials and implementing secure access patterns. For example, some services may not encrypt credentials or other secrets, which may increase security risks. Further, external implementations of IaC may be limited to certain programming language structures that may be incompatible with an entity's software or hardware implementations by the entity and may increase developer burden associated with learning and implementing IaC.

A resource provisioning system can be used in various scenarios to automate the provisioning of computing resources (e.g., servers, containers, storage, etc.). The computing resources may be provisioned in a cloud environment. The resource provisioning system can provision computing resources based on source code provided at an interface of the resource provisioning system and stored in a centralized repository. The centralized repository can include access control functionality including, but not limited to, credential management and authorization protocols to prevent unauthorized access to the source code. The resource provisioning system can automate the provisioning of computing resources by implementing a deployment workflow (e.g., a CI/CD workflow) to execute the source code and provision the computing resources. The workflow can include deploying and executing a deployment pipeline including execution jobs determined based on the source code. The execution jobs of the deployment pipeline may be executed on a utility module (e.g., server). In some examples, the utility module may include one or more agents configured to execute the execution jobs by building and testing the source code. An execution of the deployment pipeline may provision the computing resources. The resource provisioning system may generate a resource configuration file based on the execution of the deployment pipeline. The resource configuration file can include a current state of the computing resources and may be used by the resource provisioning system to more efficiently automate subsequent requests to provision the computing resources and/or automate the provisioning of other related computing resources.

The disclosed techniques described herein provide improvements to computing resource provisioning by enabling an entity to manage a resource provisioning system using an automated IaC deployment workflow. The automated computing resource provisioning process can improve efficiency and reduce errors associated with manual provisioning of computing resources. The disclosed methods may reduce security vulnerabilities by providing an entity with control over IaC implementations and reducing the need to incorporate external IaC services. Further, the disclosed methods can improve management of credentials and improve access control by providing a secure and unified management of credentials. Additionally, the resource provisioning system can enable improved management of computing resources in various environments, including on-premises and cloud environments, which may enable more efficient resource selection and usage.

FIG. 1 is an illustration of an example flow 100 for provisioning computing resources in accordance with at least one embodiment. The operations discussed in connection with FIG. 1 may be performed with or performed by a resource provisioning system 111. The resource provisioning system 111 can manage a computing resource provisioning process for one or more computing resources in a cloud environment, on-premises, or a combination thereof. In some embodiments, the resource provisioning system 111 may be implemented by one or more computer(s), as a service, within an application, or the like. Additional details related to the resource provisioning system 111 are described below, such as with respect to FIG. 2. The operations discussed in FIG. 1 may be performed in any suitable order. More or fewer operations than those depicted in FIG. 1 may be employed without diverting from this disclosure.

The flow 100 may begin at block 102, where an interface of the resource provisioning system 111 receives source code. In some embodiments, the source code is provided by one or more entities 112 (e.g., users) operating a computing device (e.g., a computer, etc.). The source code 114 can include one or more commands to provision one or more computing resources in a cloud environment 122. Provisioning one or more computing resources in the cloud environment 122 can include creating, preparing, and activating underlaying infrastructure of the cloud environment 122 to configure the one or more computing resources. As an example, the source code 114 can include a command to create a virtual machine in the cloud environment 122. In some embodiments, provisioning a computing resource can include creating a computing resource, modifying an existing or previously created computing resource, deleting a computing resource, or combinations thereof.

The source code 114 may be a file, collection of text, a list of instructions, etc. In some embodiments, the source code 114 can be written in a declarative configuration language (DCL) and can include a desired state of the one or more computing resources. Source code 114 corresponding to a DCL may represent the desired state of the one or more computing resources using blocks containing key-value pairs for various attributes and variables. Additionally or alternatively, the source code 114 can include code corresponding to an programming language (e.g. C, Java, Python, etc.) that contains commands for provisioning the one or more computing resources. The source code 114 may include one or more application programming interface (API) calls. Each API call may be executed to access a respective resource of the cloud environment and/or cause one or more changes to a computing resource.

The flow 100 may continue at block 104, where the source code 114 is stored in a repository 116. The repository 116 can be a centralized repository configured to store code and other associated files in a central location including, but not limited to, a server, a computing device, a cloud instance, etc. In some embodiments, the repository 116 is hosted in a cloud environment. In some embodiments, the repository 116 can be implemented via a distributed system including one or more servers. The servers in the distributed system may be physically located in a centralized location or in various physical locations while appearing to be located in the same virtual location (e.g., in a cloud environment). In some embodiments, the repository 116 can be accessed via a code management system (e.g., GitHub, Azure DevOps, etc.).

In some embodiments, the repository 116 may include access control functionality to control access to the source code 114. Access control functionality may be implemented using authentication protocols, authorization, security settings, or combinations thereof. Access control functionality can prevent an unauthorized process to access code. In some embodiments, the entity 112 may be associated with a user profile. The user profile may be associated with access credentials that can be used to determine access privileges of the user profile and/or entity 112. In some embodiments, the entity 112 may be permitted to submit the source code 114 if a user profile associated with the entity 112 is determined to have valid access privileges. Alternatively, the entity 112 may not be permitted to submit the source code 114 if a user profile associated with the entity 112 is determined to not have valid access privileges.

The flow 100 may continue at block 106, where an orchestration module 118 deploys a continuous integration (CI) pipeline based on the source code 114. The orchestration module 118 may be configured to generate an automated workflow for building, testing, and deploying applications such as IaC implementations. Examples of orchestration modules include, but are not limited to, Azure Pipelines, GitHub Actions, Jenkins, GitLab, etc. The deployment pipeline can be or can include one or more execution jobs and/or an execution plan for executing one or more jobs. The deployment pipeline may include multiple automated stages including, but not limited to, a build stage, test stage, deployment stage and execution stage. Each stage may be or may include one or more jobs (e.g., build job, execution job, etc.). Deploying the deployment pipeline can include determining the various stages and jobs of the deployment pipeline and providing an execution plan to one or more components of the utility module 120. One or more execution jobs can include an execution of at least a section of the source code 114 to provision a computing resource in the cloud environment 122.

In some embodiments, the orchestration module 118 can identify one or more parameters associated with the deployment pipeline. The parameters can include variables associated with the source code 114 and/or credentials associated with the entities 112. In some examples, the orchestration module 118 may determine that executing the deployment pipeline may be based on one or more parameters and may populate the utility module 120 with the one or more parameters. In some examples, the one or more parameters can include a credential that can authorize the execution of the deployment pipeline. Additionally or alternatively, populating the utility module 120 can include installing software, configuring an environment or initializing the utility module 120 with one or more configuration parameters, files, libraries, or execution tools associated with the execution of the source code 114.

The flow 100 may continue at block 108, where the deployment pipeline is executed by a utility module 120 to provision the one or more computing resources in the cloud environment 122. The utility module 120 can be a computing resource including, but not limited to, a server, a compute instance, a virtual machine, computing device, etc. As examples, the utility module 120 can be a virtual machine hosted in a cloud environment or an on-premises server. The utility module 120 can include an agent configured to execute one or more components of the deployment pipeline (e.g., an execution job and/or execution step). In some embodiments, the utility module 120 may be populated with one or more execution resources that can enable execution of the deployment pipeline. Examples of execution resources include, but are not limited to, code libraries, script packages, API libraries, testing components, cloud provider plugins, environment variables, etc. The utility module 120 may include one or more agents configured to execute various stages of the deployment pipeline. For example, an agent hosted on the utility module 120 may build the source code 114 by converting the source code 114 from a declarative format to an executable format. Upon executing the deployment pipeline, one or more computing resources may be provisioned in the cloud environment 122.

The flow 100 may continue at block 110, where a resource configuration file 124 is generated based on the execution of the deployment pipeline. The resource configuration file 124 can include a current state of the one or more computing resources provisioned by the execution of the source code 114. The resource configuration file 124 may include metadata, attributes, and other relevant information corresponding to the state of one or more computing resources. In some embodiments, the resource configuration file 124 is a file configured to hold information about a resource, such as a JSON file, csv file, etc. In some examples, the resource configuration file 124 may refer to a collection of state information associated with multiple computing resources and may be represented by an object (e.g., table, column, etc.) in a data store. The resource configuration file 124 can include information about a computing resource such as resource metadata (e.g., type of resource, resource names, etc.), resource attributes (e.g., size of resource, resource address, parameters associated with resource, etc.), and resource dependency relationships. Alternatively or additionally, the resource configuration file 124 may include variables and output values corresponding to the computing resources. Output values may include outputs generated by the cloud service provider upon provisioning the computing resource. Examples of outputs may include resource addresses, resource identifiers and API endpoints. The resource configuration file 124 may be stored and managed by the resource provision system to monitor and identify changes to the state of a computing resource.

The resource provisioning system 111 can use the resource configuration file 124 associated with the one or more provisioned computing resources to plan and execute subsequent requests corresponding to the provisioned computing resources. For example, the resource provisioning system 111 may receive a second source code input and may determine potential changes to the provisioned computing resources based on a known state stored in the resource configuration file 124. The resource provisioning system 111 can deploy and execute a deployment pipeline to apply the potential changes determined using the resource configuration file 124. In some examples, the resource provisioning system 111 may determine an order of source code execution based on resource dependency relationships included in the resource configuration file 124. In some examples, the resource provisioning system 111 can use outputs and/or resource dependency relationships included in the resource configuration file 124 to provision a second set of one or more computing resources. For example, the second set of computing resources may be associated with or include dependencies on the provisioned computing resources. In such examples, the resource provisioning system 111 may retrieve resource dependency relationships and/or output values generated by the cloud service provider and stored in the resource configuration file 124 to determine appropriate variables and/or parameters associated with relevant source code and execute an execution plan to provision the second set of computing resources.

Figure 2:
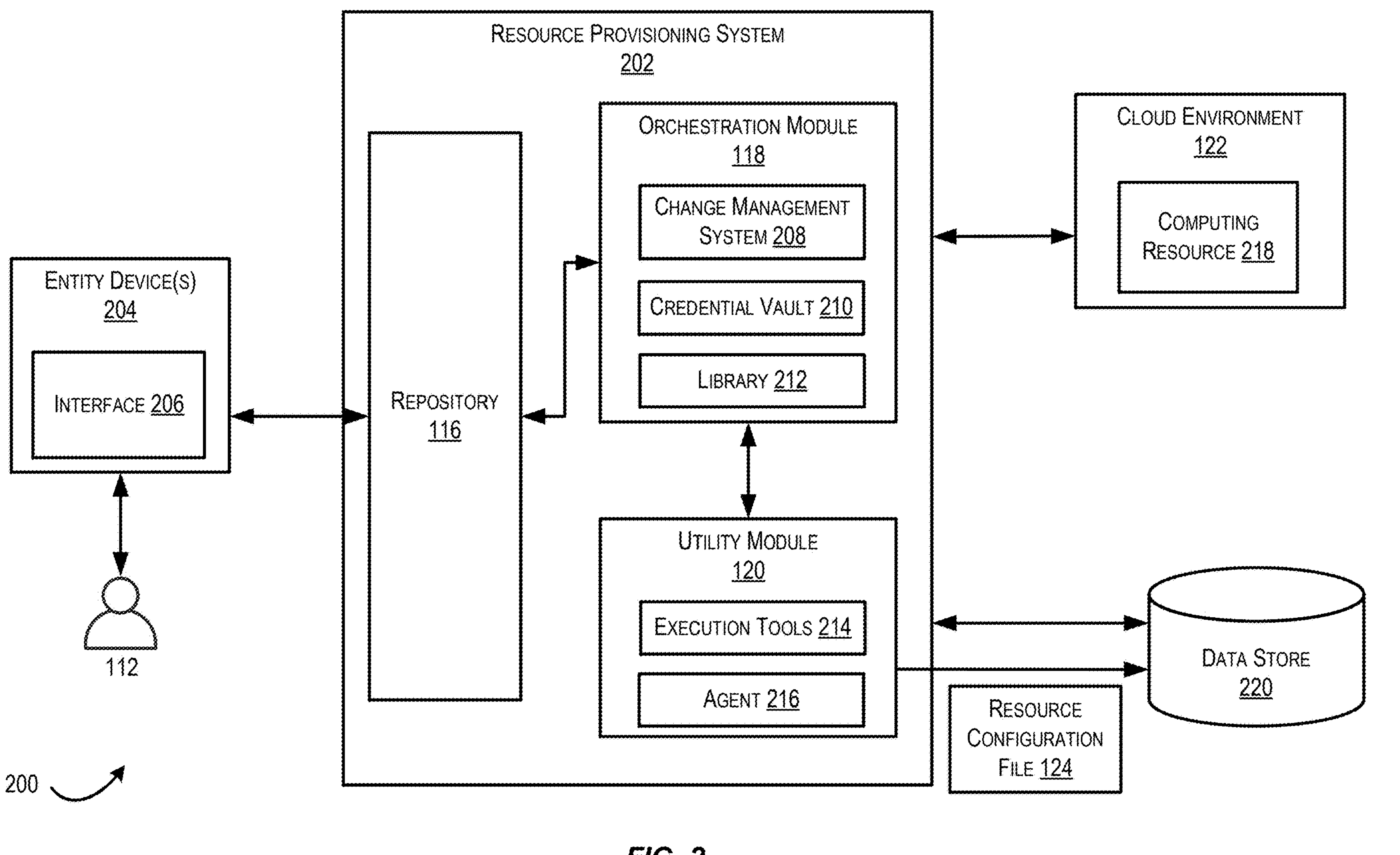
FIG. 2 is an example block diagram illustrating an example computing system for provisioning a computing resource, in accordance with at least one embodiment.

FIG. 2 is an example block diagram 200 illustrating an example computing system for provisioning a computing resource by a resource provisioning system 202 (e.g., resource provisioning system 111 of FIG. 1), in accordance with at least one embodiment. Certain aspects of FIG. 2 are described below with reference to components of FIG. 1. While FIG. 2 depicts a specific arrangement of components, other examples can include more components, fewer components, different components, or a different arrangement of components shown in FIG. 2.

In some embodiments, an entity 112 can access an interface 206 of the resource provisioning system 202 via one or more entity device(s) 204. The entity device(s) 204 can be a computing device (e.g., a computer, etc.) and may access the resource provisioning system 202 via a network (e.g., the Internet, a wireless communication network, a wired network connecting to a server, etc.). The entity 112 may generate and/or submit source code 114 including commands for provisioning a computing resource. Additionally or alternatively, the source code 114 can include a desired state of one or more computing resources 218.

The interface 206 can be a user interface (e.g., graphical user interface (GUI), command line interface, etc.), API, hardware interface (e.g., USB, etc.), or other such interface that enables the entity 112 to interact with the resource provisioning system 202. The repository 116 can be a centralized repository configured to store data (e.g., documents, files, code directories, etc.) in a unified location or system. The repository 116 may be configured to enable version control. In some embodiments, the repository 116 may be managed by a source code management system that tracks and manages changes to source code. Version control can include storing a current version and one or more previous versions of data in the repository 116. For example, source code 114 may be a first version of a particular code in the repository 116 and may be stored as an initial version of the source code 114. The entity 112 may update one or more parts of the source code 114 and provide the updates via the interface 206 in a subsequent source code transmission. The updates to the source code 114 may be saved as a current version, and the initial version of the source code 114 may be accessible via a version history of the source code 114. In some examples, a comparison of changes between versions of the source code can be performed to identify changes to the source code 114. The repository 116 can be configured to revert one or more changes to the source code based on a version history and/or record of the source code changes.

In some embodiments, the repository 116 can include one or more controls for code review. As an example, the repository 116 can include one or more branches to enable multiple entities (e.g., collaborators) to create and provide code independently. The repository 116 may include a main branch that includes code determined to be ready for production. Source code 114 may be uploaded to a secondary branch of the repository 116. To stage the source code 114, a pull request may be initiated to verify and review the source code. In some examples, a pull request may be automatically reviewed by performing an automated test on the code and determining the source code 114 passes a sufficient number of tests. In some examples, the pull request is approved by an entity associated with broader administrative or access control privileges. Approving a pull request can include determining a branch that includes the source code 114 can be deployed and executed in a production environment. Approving a pull request can trigger a merge of a secondary branch and the main branch such that the main branch includes source code changes in the secondary branch. An approval of the pull request may be provided as a user input by a user and can initiate the deployment and execution of a deployment pipeline.

The resource provisioning system 202 can include an orchestration module 118. The orchestration module 118 can include a change management system 208, a credential vault 210, and a library 212. In some embodiments, the orchestration module 118 can include more components, fewer components, or different components. The orchestration module 118 may generate a deployment pipeline based on the source code 114 and changes to existing code based on the source code 114. The change management system 208 can create a change record associated with the source code 114 and the computing resource 218 provisioned by the source code 114. The change record can be a change ticket, a change request, or other record indicating a change to code in the repository 116. For example, the change record may contain lines of code associated with new changes to code in the repository 116. The change record may contain a state value indicating a state of the change associated with the change record. The change record state value may be a numeric value, string value, or combinations thereof. As examples, the change record value can be "In progress", "Failed", "Awaiting approval", etc. Additionally or alternatively, the change record may be associated with a pull request and can include information about the status of a pull request. In some embodiments, the orchestration module 118 may generate a deployment pipeline based on the state of a change record value. For example, if the change record state indicates a previous change associated with the computing resources is "Awaiting approval", the orchestration module 118 may determine the execution of one or more changes associated with the source code 114 are expected to wait for pending changes to complete execution. In other examples, the orchestration module 118 may determine the build should not be executed and set the change record state to "Failed" due to conflicting change requests. In some examples, if the change record state value matches and expected value, the change management system 208 may authorize the execution of the deployment pipeline.

In some embodiments, the orchestration module 118 may include a deployment configuration file (e.g., a CI/CD configuration file). The deployment configuration file may define steps for building, testing and deploying code. In some examples, the deployment configuration file can include instructions and/or commands that can be executed based on specified triggers or events to deploy and/or execute the deployment pipeline. The deployment configuration file may include definitions for properties associated with the deployment pipeline including, but not limited to, execution environments, jobs, tasks, variables, artifacts and dependencies. Additionally or alternatively, the orchestration module 118 may include a deployment configuration script containing code associated with commands to generate and/or deploy a deployment pipeline. The deployment configuration script may enable automated and programmatic generation and execution of the deployment pipeline rather than being limited to a fixed schema in a configuration file. In some embodiments, the orchestration module 118 may identify one or more relevant parameters from a credential vault 210 and/or library 212. The library 212 can include one or more parameters (e.g., variables, values, etc.) that can enable execution of the source code 114. In some embodiments, the library 212 can include configuration files and/or scripts that may be provided to a utility module 120 to execute the deployment pipeline. In some examples, the orchestration module 118 can replace a portion of the source code 114 with a parameter from the library 212 to enable execution of the source code 114. As an example, the source code may contain a placeholder for a variable associated with an execution of the source code. For example, the entity 112 may not have knowledge of particular values associated with the code and may include a placeholder or macro in the source code 114. The orchestration module 118 may replace the placeholder with a correct corresponding parameter from the library 212. In some examples, the orchestration module 118 may provide or populate the utility module 120 with one or more parameters and/or scripts from the library 212 to enable execution of the source code 114.

In some embodiments, provisioning a computing resource in the cloud environment 122 may be performed by an authorized user. An authorized user may be identified based on one or more credentials. Credentials can be stored in the library 212 as one or more of the parameters stored in the library 212. In some examples, the credential may be a token associated with a user. Tokens (e.g., personal access tokens, open authorization tokens, system access tokens, etc.) can be used to programmatically authenticate a user action. For example, a token may be included in an API call to authenticate the permissions of a user initiating the API call. The orchestration module 118 may associate a user and/or the source code 114 with a credential. The orchestration module 118 may use the association between the source code and the credential to authorize the execution of the deployment pipeline. For example, the orchestration module 118 may associate a token with a user and grant permissions associated with the user to the token. In some embodiments, credentials can be stored in a credential vault 210. In some examples, the credential vault 210 may be a repository configured with access control independent of access control for the repository 116. The credential vault 210 may implement additional security and encryption protocols to prevent unauthorized access or changes to credentials and other secrets stored in the credential vault 210. In some examples, credentials may be provided to the deployment pipeline to execute the source code 114 at run time. In such examples, credentials may be securely provided to a module or program requesting access to the credentials while executing the deployment pipeline.

The orchestration module 118 can deploy the deployment pipeline on the utility module 120 to execute. The utility module 120 can be a software and/or hardware component configured to execute programs (e.g., the source code 114). As examples, the utility module 120 can be a virtual machine, server, cloud compute instance, container etc. The utility module 120 may include one or more execution tools 214 and an agent 216.

In some embodiments, the deployment pipeline can include various stages for building, testing and/or executing the source code 114. Building code can include compiling the code, linking the code to a corresponding library, and packaging the code into executable software. In some examples, such as examples where the source code 114 corresponds to a declarative configuration language, building the source code 114 can include converting the source code 114 into commands (e.g., API calls) that can be executed to produce a desired state of the computing resource 218. A revision and/or successful pull request in the repository 116 can trigger an execution of a deployment workflow (e.g., a CI/CD workflow) configured to build and test the source code. In some embodiments, a workflow executed by the orchestration module 118 can include performing automated tests. Testing the source code can include verifying the source code can compile and perform an expected functionality. For example, a test may fail if the source code is expected to perform an API call, but the execution of the API call fails (e.g., due to an incorrect parameter, etc.).

The deployment pipeline can be or can include one or more execution jobs and/or one or more steps to execute a job. An execution job can include building, executing and/or testing the source code 114. Various stages of the deployment pipeline (e.g., execution jobs) may be executed by an agent 216. The agent 216 may be installable software configured to build and/or execute code. The agent 216 may execute one or more steps from an execution plan associated with the deployment pipeline. In some embodiments, the agent may be executed if user permissions are authenticated by accessing credentials from the credential vault 210 provided by the orchestration module 118. In some embodiments, the utility module 120 may include a pool of agents. Each agent 216 in the pool of agents may execute one or more separate parts of the deployment pipeline. As an example, a first agent may build the source code 114, a second agent may perform tests on the source code 114, and third agent may execute the source code 114. In some examples, multiple agents may execute various independent execution jobs associated with provisioning a computing resource. For example, the deployment pipeline may include a first execution job for creating a storage bucket and second execution job for updating virtual machine. Each execution job may be executed by one or more of the agents sequentially, in parallel, or any combination thereof.

In some embodiments, the one or more execution tools 214 can be determined by the resource provisioning system 202 when configuring the utility module 120 and/or populated by the orchestration module 118 when generating the deployment pipeline. The execution tools 214 can be tools that provide a functionality to enable execution of the source code. As examples, the execution tools 214 can include code libraries, configuration management tools, and variables identified by the orchestration module 118. As a particular example, the execution tools 214 can include scripts and cloud provider plugins corresponding to the cloud environment 122 that can enable converting the source code 114 into executable API calls.

The execution of the source code 114 by the agent 216 or other component of the utility module 120 can cause the provisioning of the computing resource 218 in the cloud environment 122. The computing resource 218 can be a computing resources including, but not limited to, a compute instance, virtual machine, server, data store, container, storage bucket, disk, etc. A state of the computing resource 218 may be updated based on the execution of the deployment pipeline. For example, the agent 216 may execute code that initializes and creates the computing resource 218. In such examples, the computing resource 218 may be a new resource (e.g., with a new resource identifier, etc.). In some examples, the agent 216 may execute code that updates an attribute of the computing resource 218. As an example, if the computing resource 218 is a virtual machine, the agent 216 may increase disk size and CPU configurations.

In some embodiments, the utility module 120 may generate one or more artifacts when executing the deployment pipeline and associated execution plan. Artifacts can include, but are not limited to build outputs, test results, configuration files, deployment logs, etc. Artifacts may be stored in a data store and may be reviewed by the entity 112. In some examples, artifacts generated during the execution of the deployment pipeline may be referenced in subsequent deployment and/or executions of a deployment pipeline. In some examples, the execution tools 214 can include one or more artifacts generated when executing a job included in the deployment pipeline.

Based on the execution of the deployment pipeline and determining one or more changes to the computing resource 218, the resource configuration file 124 can be generated by the resource provisioning system 202. In some embodiments, the resource configuration file 124 may be generated by one or more agents (e.g., agent 216) hosted on the utility module 120. In some embodiments, the resource provisioning system 202 may receive an output from the cloud environment 122 upon executing the source code 114 indicating a state of the computing resource 218 and/or a failure in execution. In such instances, the resource configuration file 124 can be generated and/or updated based on the output of the execution of the code and the output of the cloud service provider. In some cases, the cloud service provider may not produce an output containing information about the state of a provisioned resource. In such instances, the deployment pipeline may include one or more steps for determining the state of the computing resource 218. The utility module 120 may execute one or more steps to determine the current state of the computing resource 218 and generate the resource configuration file 124. As an example, the agent 216 may execute an API call to retrieve the state of the computing resource 218.

In some embodiments, the resource configuration file 124 is stored in a data store 220. The data store 220 can include one or more resource configuration files the each corresponding to a separate computing resource (e.g., computing resource 218). The data store 220 may be hosted by a local storage system accessible to the resource provisioning system 202 (e.g., a relational database hosted on an on-premises server, file-based storage on a disk, etc.). In some embodiments, the data store 220 can be a cloud-based storage system (e.g., a bucket for object storage) hosted in a cloud environment. In some embodiments, the data store 220 can include a version history of the resource configuration file 124. The version history of the resource configuration file 124 can be used to determine historical states of the computing resource 218.

Figure 3:
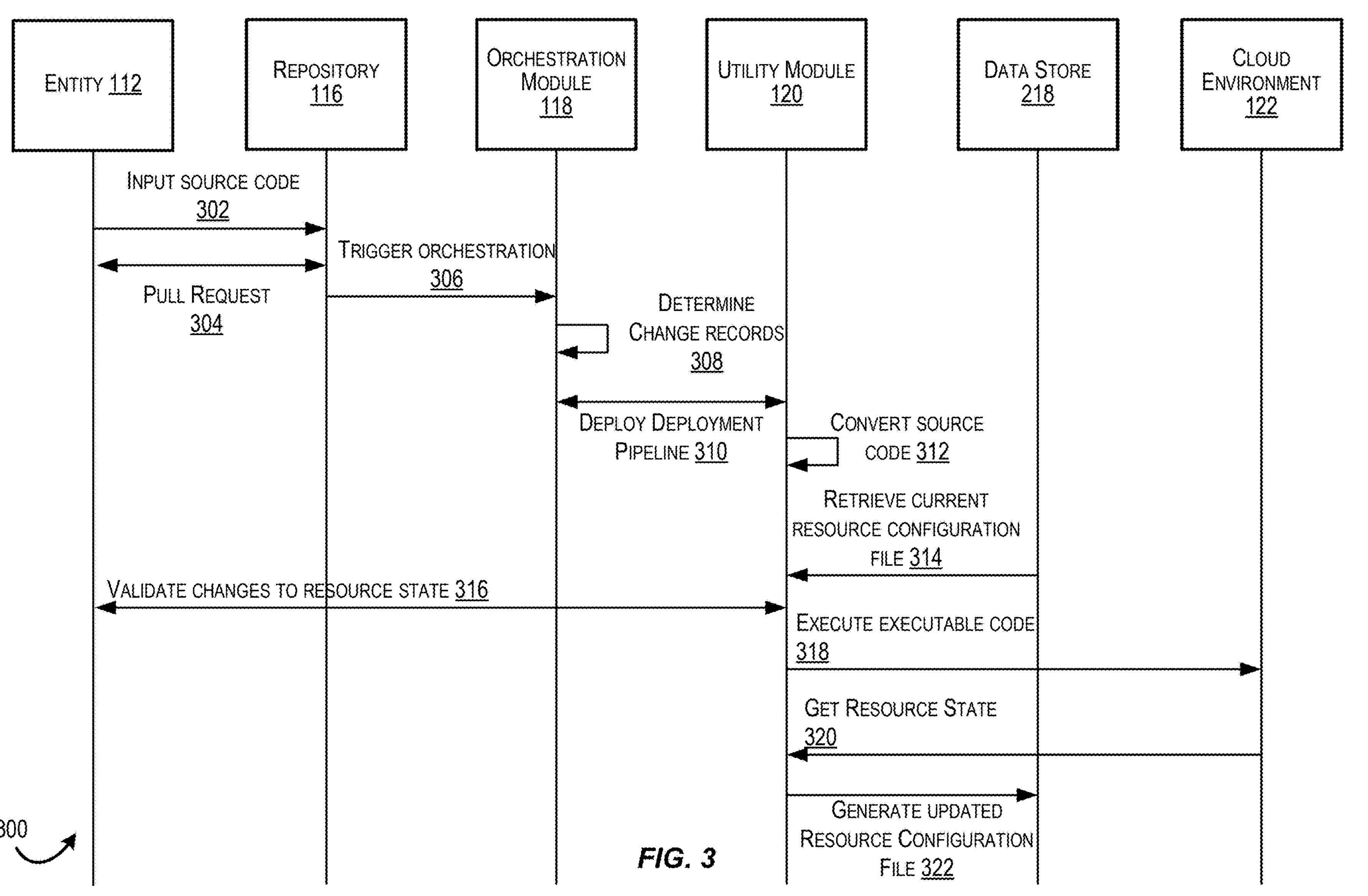
FIG. 3 is an example data flow illustrating a process for provisioning a computing resource in a cloud environment, in accordance with at least one embodiment.

FIG. 3 is an exemplary data flow 300 for provisioning one or more computing resources in a cloud environment, in accordance with at least one embodiment. Certain aspects of FIG. 3 are described below with reference to components of FIG. 1 and FIG. 2. It should be appreciated that the steps of the data flow 300 may be performed in any suitable order, not necessarily the order depicted in FIG. 3. The steps of the data flow 300 may be perform sequentially, in parallel, or any combinations thereof. Further, the flow 300 may include additional, or fewer steps than those depicted in FIG. 3

At step 302 of the data flow 300, an entity 112 can input source code 114 to the repository 116. The source code 114 may be inputted via an interface associated with the repository 116. Inputting the source code 114 can include committing code to the repository 116. The source code 114 may include commands for provisioning one or more computing resource(s) and/or the desired state of one or more computing resource(s).

At step 304 of the data flow 300, a pull request may be initiated to merge changes from the source code 114. The pull request can include a request for authorizing one or more changes to source code stored in a main branch of the repository 116 based on the inputted source code 114. The pull request may be authorized by the entity 112 or a separate entity associated with a user profile with broader administrative and/or source control privileges. In some embodiments, source code changes are merged into a main branch based on a review of the pull request.

At step 306, approval of the pull request may trigger orchestration of one or more automated deployment workflows by the orchestration module 118. The trigger for orchestration may be automated based on the approval of the pull request and/or may include a manual indication by the entity 112 to deploy a deployment pipeline for building and executing the source code 114.

At step 308, the orchestration module 118 may determine the status of any change records associated with the computing resource(s). The change records may be stored and managed by the change management system 208. The change management system 208 may identify change records associated with a computing resource(s) that may be provisioned by the executing the source code 114. In some examples, if the change management system 208 does not identify any change records associated with the computing resource(s), deployment and execution of the deployment pipeline may be authorized. In other examples, the change management system 208 may identify change records associated with the computing resource(s). The change management system 208 may identify a change record state value to determine whether the deployment and execution of the deployment pipeline can be authorized. In some cases, the change record state value may indicate a prior execution job associated with changes to the computing resource(s) is in progress and the execution of the deployment pipeline should wait until the prior execution job is complete. In some cases, the change record state value may indicate no changes should be made to the computing resource(s) and, accordingly, the change management system 208 may not authorize the execution of the deployment pipeline. In some cases, the change record state value corresponds to an expected state value indicating changes can be made to the computing resource(s) and the execution of the deployment pipeline can be authorized.

At step 310 of the data flow 300, the orchestration module 118 may deploy the deployment pipeline. Deploying the deployment pipeline can include performing preprocessing on the source code 114. Preprocessing can include identifying variables and/or parameters corresponding to the execution of the source code 114. In some embodiments, the variables can include credentials and/or tokens associated with authorizing the execution of the deployment pipeline. The credentials and parameters can be retrieved from the library 212 or credential vault 210. The orchestration module 118 may populate the utility module 120 with relevant parameters, libraries, and execution tools associated with executing the source code 114. Deploying the deployment pipeline may further include generating an execution plan including one or more stages and/or execution jobs. The execution plan may be provided to the utility module 120 to automate the execution of the source code 114 and provision the computing resource(s) in the cloud environment 122.

At step 312 of data flow 300, an agent associated with the utility module 120 may convert the source code 114 into instructions for execution. Converting the source code 114 may be an execution job and/or stage of the deployment pipeline deployed by the orchestration module 118. Converting the source code 114 for execution can include but is not limited to compiling the source code 114, identifying relevant execution tools (e.g., libraries, configurations files, cloud provider plugins, etc.) and converting the source code 114 into executable code. In some examples, the agent may generate an executable program (e.g., provider, plugin, etc.) associated with one or more API calls based on a desired state of the computing resource(s) indicated by the source code 114. For example, the source code 114 can include configuration details corresponding to a specific computing resource. As a particular example, the source code 114 may be written in a configuration language (e.g., HCL) and can include one or more resource blocks that define a desired state of the computing resource(s). The agent may identify one or more plugins associated with a cloud provider hosting the computing resource(s). The one or more plugins may be implemented using a programming language (e.g., Go) to convert computing resource configurations in the source code 114 into one or more API calls using an API endpoint associated with the computing resource (e.g., as defined by a resource block in the source code 114). In some embodiments, building the source code 114 can include performing a dry run of an execution of the source code 114. A dry run can include determining an anticipated state of the computing resource(s) without executing the source code 114 to cause any modifications to the computing resource(s).

At step 314 of data flow 300, orchestration module 118 can retrieve a current resource configuration file for resources associated with the computing resource(s) from the data store 220. The orchestration module 118 may identify potential changes to the state of the computing resource(s) based on the anticipated state of resources determined by building the source code at step 312. As examples, a change to a resource configuration file can include a change to a compute resource including, but not limited to, an updated resource ID, resource type, address space, etc. In some examples, the changes to the resource configuration file may reflect changes to computing resource(s), such as the deletion or addition of a computing resource or one or more components of a computing resource. In some examples, the source code 114 may be associated with computing resource(s) that have not been created in the cloud environment 122. In such examples, a current resource configuration file associated with the relevant computing resource(s) may not exist.

At step 316 of data flow 300, the orchestration module 118 can request a validation of changes to the resource state. The changes may be validated by the entity 112, or one or more second entities with authorization to approve changes to computing resource(s). A validation request may be provided to the entity 112. The validation request may provide a comparison of the current state and anticipated state to the entity 112 based on the source code 114. In some examples, the comparison may be provided via a user interface displaying a line-by-line comparison of the resource configuration file and anticipated state and prompting the entity 112 to examine the changes. The entity 112 can provide a confirmation that the proposed changes to the resource state are correct. The validation may be provided by a prompt to an interface, a notification to an entity, etc.

At step 318 of the data flow 300, an agent associated with the utility module 120 may execute the executable code generated based on the source code 114. Executing the executable code (e.g., a plugin, etc.) may be a stage of the deployment pipeline and may be associated with one or more execution jobs defined by an execution plan corresponding to the deployment pipeline. An execution job may include executing at least a subset of the executable code determined at step 312. In some examples, the execution jobs may be ordered such that the execution of one job enables the execution of a subsequent job. The executable code can include one or more API calls included in the source code 114 or determined based on a desired state of computing resource(s) included in the source code 114. Executing the executable code can provision the computing resource(s).

At step 320 of the data flow 300, the utility module 120 may retrieve a resource state of the computing resource(s) from the cloud environment 122. In some examples, an agent associated with the utility module 120 may receive state information as an output of executing the executable code. In some examples, an agent may request the resource state from the cloud environment 122 by executing an API call.

At step 322 of the data flow 300, the utility module 120 may generate an updated resource configuration file based on the retrieved resource state. Additionally or alternatively, agents hosted on the utility module 120 may update the resource configuration file 124 upon successfully executing the executable code and receiving updated state information about the computing resource(s) from the cloud environment 122.

Figure 4:
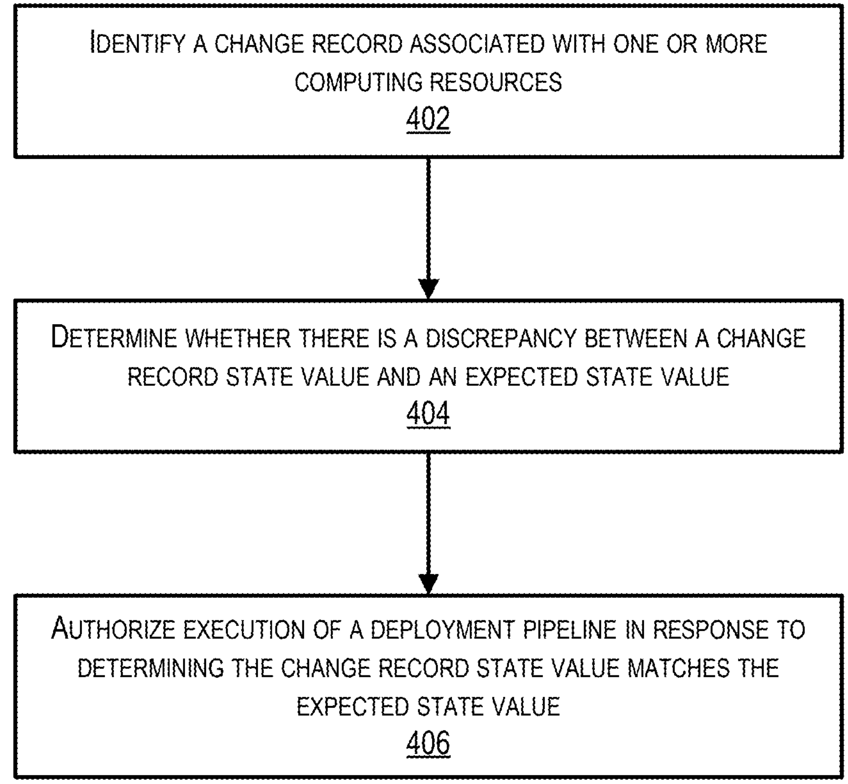
FIG. 4 is a block diagram illustrating an example method for authorizing an execution of a continuous integration (CI) pipeline, in accordance with at least one embodiment.

FIG. 4 is a block diagram illustrating an example method 400 for authorizing an execution of a deployment pipeline by an orchestration module 118, in accordance with at least one embodiment. A non-transitory computer-readable storage medium may store computer-executable instructions that, when executed by at least one processor, cause at least one computer to perform instructions comprising the operations of the method 400. It should be appreciated that the operations of the method 400 may be performed in any suitable order, not necessarily the order depicted in FIG. 4. Further, the method 400 may include additional, or fewer operations than those depicted in FIG. 4. The operations of method 400 may be performed by any suitable portion of the resource provisioning system described herein. In some embodiments, method 400 may be executed by components of the resource provisioning system 202 of FIG. 2. Certain aspects of FIG. 4 are described below with reference to components of FIGS. 1-2.

The method 400 may begin at block 402, where the change management system 208 associated with the orchestration module 118 may identify a change record associated with one or more computing resources that may be provisioned by the execution of certain source code 114. The change record can be a change ticket associated with a request to modify one or more attributes of the computing resources. The change record may indicate various types of changes including but not limited to an update, a deletion, an incident, and service request. In some embodiments, the change record may be generated by the change management system 208 when orchestration is triggered or when a pull request to the repository 116 is initiated. The change record may be stored by one or more components of the change management system 208. In some embodiments, the change record can include a resource identifier corresponding to a computing resource. The change management system 208 may identify a change record associated with a resource identifier corresponding to a target computing resource. For example, the entity 112 may provide code including instructions for updating attributes of a particular virtual machine and the change management system 208 may identify an existing change record associated with changes to the virtual machine based on a resource identifier of the virtual machine.

At block 404, a discrepancy between a change record state value and an expected state value may be determined. The discrepancy may be determined by the orchestration module 118. The state value of a change record (e.g., a change ticket) may indicate whether or not changes to the computing resources are permitted. In some examples, the change record value may be a binary value indicating whether or not the change is in an authorized state. In some examples, the change record state value may indicate various other states of a resource such as “waiting approval”, “implementation”, “execution”, etc. In some embodiments, the change record state value may be determined based on a change log maintained by the change management system 208. A discrepancy may exist if the change record includes a state value that does not permit resource updating or provisioning. For example, the change record state value may indicate a change is in progress, but the resource provisioning system 202 may not permit additional changes while another change is in progress. The change management system 208 may accordingly expect a state value indicating no changes are in progress and determine a discrepancy exists. In some examples, the expected state value can be predetermined to be one or more of possible state values for the change record. For example, the change management system 208 may expect the change record state value to be “complete” and any alternative change record state value may be determined to be a discrepancy from the expected state value. In some instances, the change management system 208 may not identify any change records associated with the computing resources at block 402. In such cases, the change management system 208 may determine there is no discrepancy between the change record state value and an expected state value.

At block 406, an execution of a deployment pipeline can be authorized in response to determining the change record state value matches the expected state value. Authorizing the execution of the deployment pipeline can include providing execution details to the utility module 120. The computing resource may subsequently be provisioned as described with respect to FIGS. 1-3. In some examples, authorizing the execution of the deployment pipeline can include generating a new change record associated with the execution. The new change record may include information corresponding to the source code 114, expected state of the one or more computing resources, a pull request associated with source code 114, a state of the execution of the deployment pipeline, or combinations thereof. In some examples, the change management system 208 may determine the change record state value does not match the expected state value. In such examples, execution of the deployment pipeline may not be authorized. The entity 112 may be prompted with an error message indicating the execution of the deployment pipeline cannot be completed. The change management system 208 may generate a change record with a corresponding state indicating the resources will not be provisioned or that an error has occurred.

Figure 5:
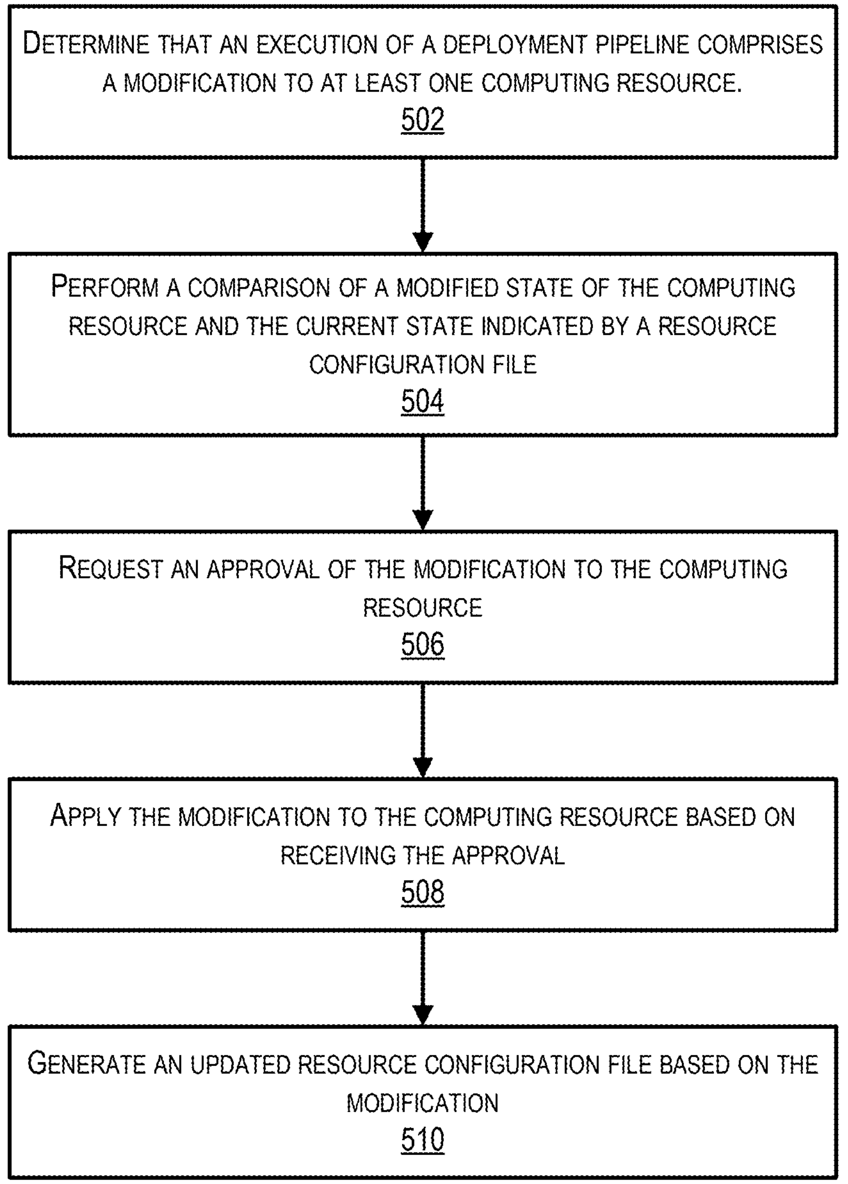
FIG. 5 is a block diagram illustrating an example method for validating a modification to a computing resource, in accordance with at least one embodiment.

FIG. 5 is a block diagram illustrating an example method 500 for validating a deployment pipeline execution, in accordance with at least one embodiment. A non-transitory computer-readable storage medium may store computer-executable instructions that, when executed by at least one processor, cause at least one computer to perform instructions comprising the operations of the method 500. It should be appreciated that the operations of the method 500 may be performed in any suitable order, not necessarily the order depicted in FIG. 5. Further, the method 500 may include additional, or fewer operations than those depicted in FIG. 5. The operations of method 500 may be performed by any suitable portion of the resource provisioning system described herein. In some embodiments, method 500 may be executed by components of the resource provisioning system 202 of FIG. 2. Certain aspects of FIG. 4 are described below with reference to components of FIGS. 1-2.

The method 500 may begin at block 502, where the orchestration module 118 may determine that an execution of the deployment pipeline includes a modification to at least one computing resources of one or more computing resources associated with the resource configuration file. A modification to a computing resource can include a change to a configuration associated with a resource, a change to a value of a resource, an addition of a component to a provisioned resource, a deletion of a component associated with a provisioned resource, etc. In some embodiments, the source code 114 may include a desired state of one or more computing resources provisioned in the cloud environment 122. The orchestration module 118 may determine an execution of the deployment pipeline includes a modification to at least one computing resource by determining the desired state included in the source code 114 does not correspond to a current state included in a resource configuration file 124 associated with the computing resource. In some embodiments, the orchestration module 118 can determine an execution of a deployment pipeline includes a modification to a computing resource based on an API call included in the source code associated with updates to computing resources. In some embodiments, the determination may be done by performing a dry run of the source code in a test environment without executing the code and/or causing changes to the cloud resources in the cloud environment 122. The dry run may output a predicted modified state of the computing resource based on the source code 114 and predicted changes to the resource configuration file 124.

At block 504, a comparison of a modified state of the one or more computing resources and the current state indicated by the resource configuration file 124 may be performed. The comparison may be performed by the orchestration module 118 and may include a comparison of attributes included in the resource configuration file 124 and attributes associated with a desired state indicated by the source code 114 and/or attributes associated with the predicted modified state generated by the dry run. Based on the comparison, the orchestration module 118 may identify one or more parameters or attributes that are expected to change based on the execution of the source code 114 and deployment pipeline.

At block 506, the orchestration module 118 may request an approval of the modification to the computing resource 218 for the entity 112. In some examples, the request for an approval may be provided via a user interface. The entity 112 may be provided with the comparison of the modified state and the current state indicated by the resource configuration file 124. In some examples, the request for approval may be provided via a dialog box or similar prompt on a graphical user interface (GUI). The entity 112 may select buttons for rejecting or approving the changes. In some examples, the user may provide comments via a text input associated with the request for approval.

At block 508, the modification may be applied to the computing resource based on receiving the approval. A change record may be generated or an existing change record associated with the modification request may be identified. A state value of the change record may be updated to indicate an execution of changes to the computing resources has been approved and/or in progress. The modification may be applied by executing one or more stages of a deployment pipeline associated with the source code 114. The deployment pipeline may be executed by the utility module 120 as described with respect to FIGS. 1-3.

At block 510, an updated resource configuration file may be generated based on the modification. In some embodiments, the resource provisioning system 202 may request a current state of the computing resource from the cloud provider hosting the cloud environment 122. The resource provisioning system 202 may execute one or more API calls to determine a current state of the computing resource. Based on a determined state of the computing resource, the resource provisioning system 202 may generate a resource configuration file 124 containing relevant information about the state of the resources. In some examples, the resource provisioning system 202 may receive one or more outputs including state information about the computing resource upon executing the source code 114 and applying the modifications to the computing resource. In such examples, the outputs may be used to determine and generate the updated resource configuration file.

Figure 6:
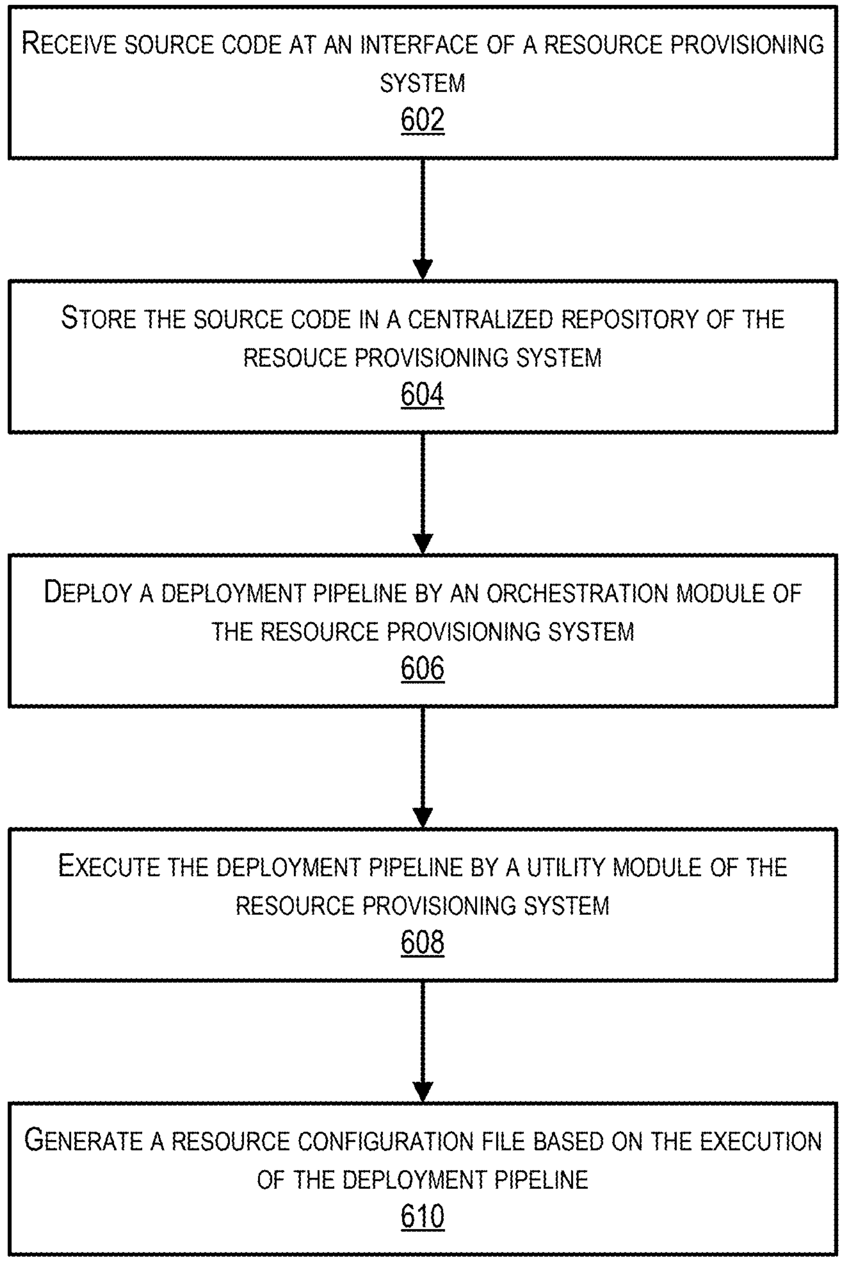
FIG. 6 is a block diagram illustrating an example method of implementing a resource provisioning process to provision one or more computing resources in a cloud environment, in accordance with at least one embodiment.

FIG. 6 is a block diagram illustrating an example method 600 of implementing a resource provisioning process to provision one or more computing resources in a cloud environment 122, in accordance with at least one embodiment. A non-transitory computer-readable storage medium may store computer-executable instructions that, when executed by at least one processor, cause at least one computer to perform instructions comprising the operations of the method 600. It should be appreciated that the operations of the method 600 may be performed in any suitable order, not necessarily the order depicted in FIG. 6. Further, the method 600 may include additional, or fewer operations than those depicted in FIG. 6. The operations of method 600 may be performed by any suitable portion of the resource provisioning system 202 of FIG. 6 which may include one or more computing devices such as computing device 700 of FIG. 7. Certain aspects of FIG. 6 are described below with references to components of other figures, such as FIGS. 1-5.

The method 600 may begin at block 602, where the resource provisioning system 202 can receive source code 114 at an interface of the resource provisioning system 202. The source code 114 may include one or more commands to provision one or more computing resources in the cloud environment 122. In some examples, the source code 114 includes one or more application programming interface (API) call that are each executable to access a respective resource (e.g., computing resource 218) of the cloud environment 122. Executing the one or more API calls can cause one or more changes to a computing resource of the one or more computing resources. In some examples, the source code 114 can include one or more declarations corresponding to a desired state of a computing resource in the cloud environment 122.

At block 604, the source code 114 is stored in a centralized repository (e.g., repository 116) of the resource provisioning system 202. The repository 116 can include access control functionality to control access to the source code 114.

At block 606, a deployment pipeline is deployed by an orchestration module 118 of the resource provisioning system 202 based on the source code 114. In some examples, deploying the deployment pipeline can include accessing, by the orchestration module 118, an orchestration module library (e.g., library 212) including one or more parameters. The orchestration module 118 may modify the source code by replacing a portion of the source code 114 with a corresponding parameter of the one or more parameters. The orchestration module 118 may generate an execution plan comprising one or more steps to execute the source code 114. In some examples, the one or more steps can include converting the source code into an executable [programming snippet (e.g., into an API call)]. In some examples, the one or more parameters can include a credential. The orchestration module 118 may generate an associated between the credential stored in the library 212 and a corresponding portion of the source code 114. For example, the source code 114 may include a macro and/or placeholder variable for a credential that can be authenticated by a credential vault 210.

In some embodiments, prior to executing the deployment pipeline, the resource provisioning system 202 may receive user input providing instructions to initiate an execution of the deployment pipeline. The resource provisioning system 202 may determine, based on access credentials associated with a user profile corresponding to the user input, access privileges of the user profile. The resource provisioning system 202 may determine that the access privileges permit the execution of the deployment pipeline.

In some embodiments, a change management system 208 associated with the orchestration module 118 may identify a change record associated with the one or more computing resources. Prior to executing the deployment pipeline, the orchestration module 118 may determine whether there is a discrepancy between a change record state value corresponding to the change record and an expected state value. In response to determining that the change record state value matches the expected state value, the orchestration module 118 may authorize the execution of the deployment pipeline. The orchestration module 118 may generate a new change record for the current execution of the deployment pipeline. In some examples, the orchestration module 118 may determine the change record state value does not match the expected value. In such examples, the orchestration module 118 may set the change record value to an indication that the execution could not be completed and/or that the current execution is pending on the completion of another execution.

At block 608, a utility module 120 of the resource provisioning system 202 can execute the deployment pipeline to provision the one or more computing resources in the cloud environment 122. The execution of the deployment pipeline can include executing the one or more steps in an execution plan determine by the orchestration module 118. In some examples, the orchestration module 118 may determine that the execution of the deployment pipeline includes a modification to at least one computing resource of the one or more computing resources associated with a resource configuration file 124. The orchestration module 118 may perform a comparison performing a comparison of a modified state of the one or more computing resources and the current state indicated by the resource configuration file 124. The orchestration module 118 may request, from a particular entity (e.g., entity 112) and based on the comparison, an approval of the modification to the at least one computing resource. Based on receiving, the modification to the at least one computing resource can be applied by the utility module 120. The utility module 120 may generate an updated resource configuration file based on the modification to the at least one computing resource.

In some embodiments, the utility module 120 may be populated with one or more execution tools that provide a respective functionality to execute the source code 114. The one or more steps of the deployment pipeline to provision the one or more computing resource may be executed by an agent 216 hosted on the utility module 120.

At block 610, the resource provisioning system 202 can generate a resource configuration file based on the execution of the deployment pipeline. The resource configuration file 124 can include a current state of the one or more computing resources.

Figure 7:
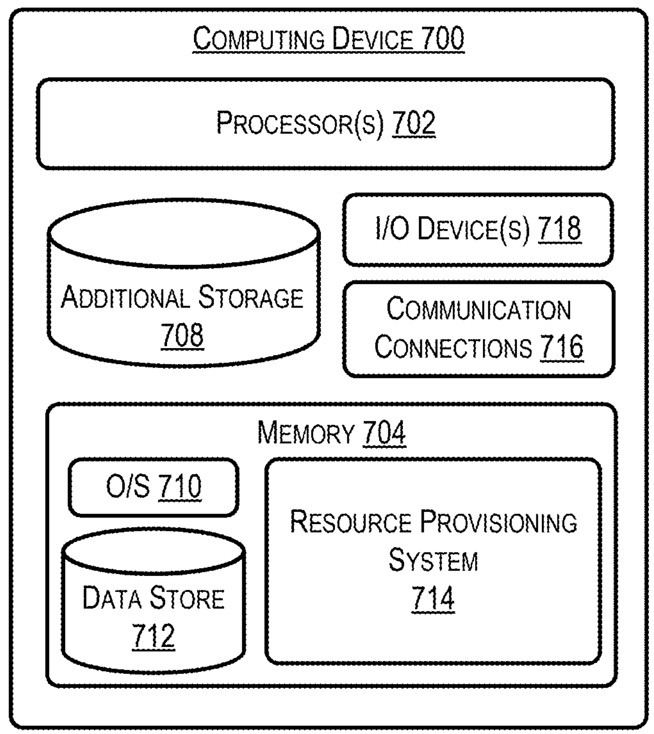
FIG. 7 illustrates an example computing device that may implement the methods disclosed herein.

FIG. 7 illustrates an example computing device 700 that may implement the methods disclosed herein. In some embodiments, the computing device 700 may include one or more processors (e.g., processor(s) 702). The processor(s) 702 may be implemented in hardware, computer-executable instructions, firmware, or combinations thereof. Computer-executable instruction or firmware implementations of the processor(s) 702 may include computer-executable or machine-executable instructions written in any suitable programming language.

Computing device 700 may include memory 704. The memory 704 may store computer-executable instructions that are loadable and executable by the processor(s) 702, as well as data generated during the execution of these programs. The memory 704 may be volatile (such as RAM) and/or non-volatile (such as ROM, flash memory, etc.). The computing device 700 may include additional storage 706, which may include removable storage and/or non-removable storage. The additional storage 706 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 704 or additional storage 706 may individually, or collectively, include multiple different types of memory, such as SRAM, DRAM, or ROM.

The memory 704 and/or additional storage 708 may be examples of computer-readable storage media. Computer-readable storage media may include volatile, or non-volatile, removable or non-removable media implemented in any method or technology for storage of information such as computer-readable instructions, data structures, program modules, or other data. In some embodiments, memory 704 and the additional storage 708 are examples of computer storage media. Memory 704 and/or additional storage 708 may include, but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 700. Combinations of any of the above should also be included within the scope of computer-readable media. Computer-readable media may include computer-readable instructions, program modules, or other data transmitted within a data signal, such as a carrier wave, or other transmission. However, as used herein, computer-readable storage media does not include computer-readable communication media.

The memory 704 may include an operating system 710 and one or more data stores 712, and/or one or more application programs, modules, or services for implementing the features disclosed herein, such as the features provided by the resource provisioning system 714 (an example of the resource provisioning system 202 of FIG. 2).

The computing device may also contain communications connection(s) 716 that allow the computing device 700 to communicate with a stored database, another computing device, a server, user terminals and/or other devices (e.g., via one or more networks, not depicted). The computing device may also include I/O device(s) 718, such as a keyboard, a mouse, a pen, a voice input device, a touch input device, a display, speakers, a printer, etc.

As described herein, the resource provisioning system 714 can be used to automate the provisioning of computing resources such as those used in implementing financial operations. The computer resources may support applications, reporting tools, and the like that a financial institution may use as part of its operations. In some examples, the resource provisioning system 714 can function as a software-as-a-service (SaaS) implementation using IaC that enables a user to provision computing resources in a cloud environment. The user can manage and provision computing resources by inputting one or more scripts (e.g., source code 114 of FIG. 1) to the resource provisioning system via an interface (e.g., a GUI). The scripts can include commands to provision computing resources (e.g., via API calls) and/or can include a desired state of the computing resources (e.g., through a declarative configuration language such as HCL). The scripts can be stored in a centralized repository with access control functionality. The resource provisioning system 714 can implement deployment workflows (e.g., by the orchestration module 118 of FIG. 1) to orchestrate execution of the scripts. The deployment workflows may automate the execution of the scripts by parameterizing relevant variables and parameters corresponding to the scripts and determining an order of execution of various components of the scripts. The scripts can be executed on a utility module (e.g., a server, container, virtual machine, etc.) seeded with execution tools including, but not limited to, libraries that may be accessed to execute the scripts. In some examples, the scripts may be executed by one or more agents hosted on the utility module. Executing the scripts can cause the provisioning of the computing resources in a cloud environment. For example, executing the scripts can include executing an API call to a cloud service provider for creating, updating, and/or deleting a computing resource. The resource provisioning system 714 may generate a resource configuration file (e.g., resource configuration file 124 of FIG. 1) including a current state of the computing resources based on the execution of the scripts through the deployment workflows. The resource configuration file may maintain an inventory of the provisioned resources and can be accessed by the resource provisioning system 174 in subsequent requests for the same provisioned resources to determine potential changes and prevent duplication of resources.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

receiving source code inputted at an interface of a resource provisioning system, the source code comprising one or more commands to provision one or more computing resources in a cloud environment, wherein the resource provisioning system comprises a centralized repository, an orchestration module, and a utility module implemented as executable instruction stored in a memory and executed by one or more processors;

storing the source code in the centralized repository of the resource provisioning system, the centralized repository comprising access control functionality to control access to the source code;

determining, by the orchestration module, a change record state value of one or more change records associated with the one or more computing resources, wherein the one or more change records are managed by a change management system associated with the orchestration module;

authorizing, by the change management system, execution of a deployment pipeline based on the change record state value;

deploying, by the orchestration module, based on the source code and the authorization, the deployment pipeline;

populating, by the orchestration module, the utility module with one or more execution tools that provide a respective functionality to execute the source code;

executing, by an agent hosted on the utility module and using the one or more execution tools, one or more steps of the deployment pipeline to provision the one or more computing resources in the cloud environment, wherein executing the one or more steps of the deployment pipeline comprises:

converting, by the agent, the source code into executable code, performing, by the agent, a dry run of an execution of the source code, wherein the dry run comprises determining an anticipated state of the one or more computing resources without executing the source code, and executing, by the agent using the one or more execution tools of the utility module, the executable code upon validating the anticipated state of the one or more computing resources;

provisioning, by the utility module, the one or more computing resources based on executing the deployment pipeline; and generating, by the utility module, a resource configuration file based on executing the deployment pipeline, wherein:

the resource configuration file comprises a current state of the one or more computing resources, and the current state of the one or more computing resources comprises an output value of executing the deployment pipeline and resource dependency relationship information.

2. The computer-implemented method of claim 1, wherein the source code comprises one or more application programming interface (API) calls that are each executable to access a respective resource of the cloud environment, and wherein executing the one or more API calls cause one or more changes to a computing resource of the one or more computing resources.

3. The computer-implemented method of claim 1, wherein deploying the deployment pipeline comprises:

accessing, by the orchestration module, an orchestration module library comprising one or more parameters;

modifying the source code by replacing a portion of the source code with a corresponding parameter of the one or more parameters; and generating, by the orchestration module and based on the source code, an execution plan comprising one or more steps to execute the source code.

4. The computer-implemented method of claim 3, wherein the one or more parameters comprise a credential, and wherein deploying the deployment pipeline further comprises:

generating, by the orchestration module, an association between the credential stored in the orchestration module library and a corresponding portion of the source code.

5. The computer-implemented method of claim 1, further comprising:

determining that an execution of the deployment pipeline comprises a modification to at least one computing resource of the one or more computing resources associated with the resource configuration file;

performing a comparison of a modified state of the one or more computing resources and the current state indicated by the resource configuration file;

requesting, from a particular entity and based on the comparison, an approval of the modification to the at least one computing resource;

based on receiving the approval from the particular entity, applying the modification to the at least one computing resource; and generating an updated resource configuration file based on the modification to the at least one computing resource.

6. The computer-implemented method of claim 1, wherein authorizing execution of the deployment pipeline comprises:

determining whether there is a discrepancy between the change record state value corresponding to the one or more change records and an expected state value; and in response to determining that the change record state value matches the expected state value, authorizing the execution of the deployment pipeline.

7. The computer-implemented method of claim 1, further comprising, prior to executing the deployment pipeline:

receiving user input providing instructions to initiate the execution of the deployment pipeline;

determining, based on access credentials associated with a user profile corresponding to the user input, access privileges of the user profile; and determining that the access privileges permit the execution of the deployment pipeline.

8. The computer-implemented method of claim 1, further comprising:

retrieving, by the utility module, a current resource configuration file associated with the one or more computing resources, wherein validating the provisioning of the one or more computing resources is performed based on the current resource configuration file;

retrieving, from the cloud environment, the current state of the one or more computing resources; and generating an updated resource configuration file by updating the current resource configuration file with the current state of the one or more computing resources.

9. The computer-implemented method of claim 1, wherein executing the deployment pipeline further comprises:

retrieving, by the utility module and from the cloud environment, a resource state of the one or more computing resources based on executing the deployment pipeline; and generating the resource configuration file based on the resource state.

10. A system, comprising:

one or more processors; and one or more memories storing computer-executable instructions that, when executed by the one or more processors, causes the one or more processors to perform one or more operations comprising:

receiving source code inputted at an interface of a resource provisioning system, the source code comprising one or more commands to provision one or more computing resources in a cloud environment, wherein the resource provisioning system comprises a centralized repository, an orchestration module, and a utility module;

storing the source code in the centralized repository of the resource provisioning system, the centralized repository comprising access control functionality to control access to the source code;

determining, by the orchestration module, a change record state value of one or more change records associated with the one or more computing resources, wherein the one or more change records are managed by a change management system associated with the orchestration module;

authorizing, by the change management system, execution of a deployment pipeline based on the change record state value;

deploying, by the orchestration module based on the source code and the authorization, the deployment pipeline;

populating, by the orchestration module, the utility module with one or more execution tools that provide a respective functionality to execute the source code;

executing, by an agent hosted on the utility module and using the one or more execution tools, one or more steps of the deployment pipeline to provision the one or more computing resources in the cloud environment, wherein executing the one or more steps of the deployment pipeline comprises:

converting, by the agent, the source code into executable code, performing, by the agent, a dry run of an execution of the source code, wherein the dry run comprises determining an anticipated state of the one or more computing resources without executing the source code, and executing, by the agent using the one or more execution tools of the utility module, the executable code upon validating the anticipated state of the one or more computing resources;

provisioning, by the utility module, the one or more computing resources based on executing the deployment pipeline; and generating, by the utility module, a resource configuration file based on executing the deployment pipeline, wherein:

the resource configuration file comprises a current state of the one or more computing resources, and the current state of the one or more computing resources comprises an output value of executing the deployment pipeline and resource dependency relationship information.

11. The system of claim 10, wherein the source code comprises one or more application programming interface (API) calls that are each executable to access a respective resource of the cloud environment, and wherein executing the one or more API calls cause one or more changes to a computing resource of the one or more computing resources.

12. The system of claim 10, wherein deploying the deployment pipeline comprises:

accessing, by the orchestration module, an orchestration module library comprising one or more parameters;

modifying the source code by replacing a portion of the source code with a corresponding parameter of the one or more parameters; and generating, by the orchestration module and based on the source code, an execution plan comprising one or more steps to execute the source code.

13. The system of claim 10, wherein the operations further comprise:

determining that an execution of the deployment pipeline comprises a modification to at least one computing resource of the one or more computing resources associated with the resource configuration file performing a comparison of a modified state of the one or more computing resources and the current state indicated by the resource configuration file;

requesting, from a particular entity and based on the comparison, an approval of the modification to the at least one computing resource;

based on receiving the approval from the particular entity, applying the modification to the at least one computing resource; and generating an updated resource configuration file based on the modification to the at least one computing resource.

14. The system of claim 10, wherein authorizing execution of the deployment pipeline comprises:

determining whether there is a discrepancy between the change record state value corresponding to the one or more change records and an expected state value; and in response to determining that the change record state value matches the expected state value, authorizing the execution of the deployment pipeline.

15. The system of claim 10, further comprising, prior to executing the deployment pipeline:

receiving user input providing instructions to initiate the execution of the deployment pipeline;

determining, based on access credentials associated with a user profile corresponding to the user input, access privileges of the user profile; and determining that the access privileges permit the execution of the deployment pipeline.

16. A non-transitory computer-readable storage medium storing computer-executable instructions that, when executed with one or more processors of a computing device, causes the computing device to perform one or more operations comprising:

receiving source code inputted at an interface of a resource provisioning system, the source code comprising one or more commands to provision one or more computing resources in a cloud environment, wherein the resource provisioning system comprises a centralized repository, an orchestration module, and a utility module;

storing the source code in the centralized repository of the resource provisioning system, the centralized repository comprising access control functionality to control access to the source code;

determining, by the orchestration module, a change record state value of one or more change records associated with the one or more computing resources, wherein the one or more change records are managed by a change management system associated with the orchestration module;

authorizing, by the change management system, execution of a deployment pipeline based on the change record state value;

deploying, by the orchestration module based on the source code and the authorization, the deployment pipeline;

populating, by the orchestration module, the utility module with one or more execution tools that provide a respective functionality to execute the source code;

executing, by an agent hosted on the utility module and using the one or more execution tools, one or more steps of the deployment pipeline to provision the one or more computing resources in the cloud environment, wherein executing the one or more steps of the deployment pipeline comprises:

converting, by the agent, the source code into executable code, performing, by the agent, a dry run of an execution of the source code, wherein the dry run comprises determining an anticipated state of the one or more computing resources without executing the source code, and executing, by the agent using the one or more execution tools of the utility module, the executable code upon validating the anticipated state of the one or more computing resources;

provisioning, by the utility module, the one or more computing resources based on executing the deployment pipeline; and generating, by the utility module, a resource configuration file based on executing the deployment pipeline, wherein:

the resource configuration file comprises a current state of the one or more computing resources, and the current state of the one or more computing resources comprises an output value of executing the deployment pipeline and resource dependency relationship information.

17. The non-transitory computer-readable storage medium of claim 16, wherein deploying the deployment pipeline comprises:

accessing, by the orchestration module, an orchestration module library comprising one or more parameters;

modifying the source code by replacing a portion of the source code with a corresponding parameter of the one or more parameters; and generating, by the orchestration module and based on the source code, an execution plan comprising one or more steps to execute the source code.

18. The non-transitory computer-readable storage medium of claim 16, wherein the operations further comprise:

determining that an execution of the deployment pipeline comprises a modification to at least one computing resource of the one or more computing resources associated with the resource configuration file;

performing a comparison of a modified state of the one or more computing resources and the current state indicated by the resource configuration file;

requesting, from a particular entity and based on the comparison, an approval of the modification to the at least one computing resource;

based on receiving the approval from the particular entity, applying the modification to the at least one computing resource; and generating an updated resource configuration file based on the modification to the at least one computing resource.

19. The non-transitory computer-readable storage medium of claim 16, wherein authorizing execution of the deployment pipeline comprises:

determining whether there is a discrepancy between the change record state value corresponding to the one or more change records and an expected state value; and in response to determining that the change record state value matches the expected state value, authorizing the execution of the deployment pipeline.

* * * * *